March 30, 1948.  G. N. LE SAGE  2,438,811
DOUGH PRESSING AND FEEDING APPARATUS
Filed March 10, 1945   2 Sheets-Sheet 1
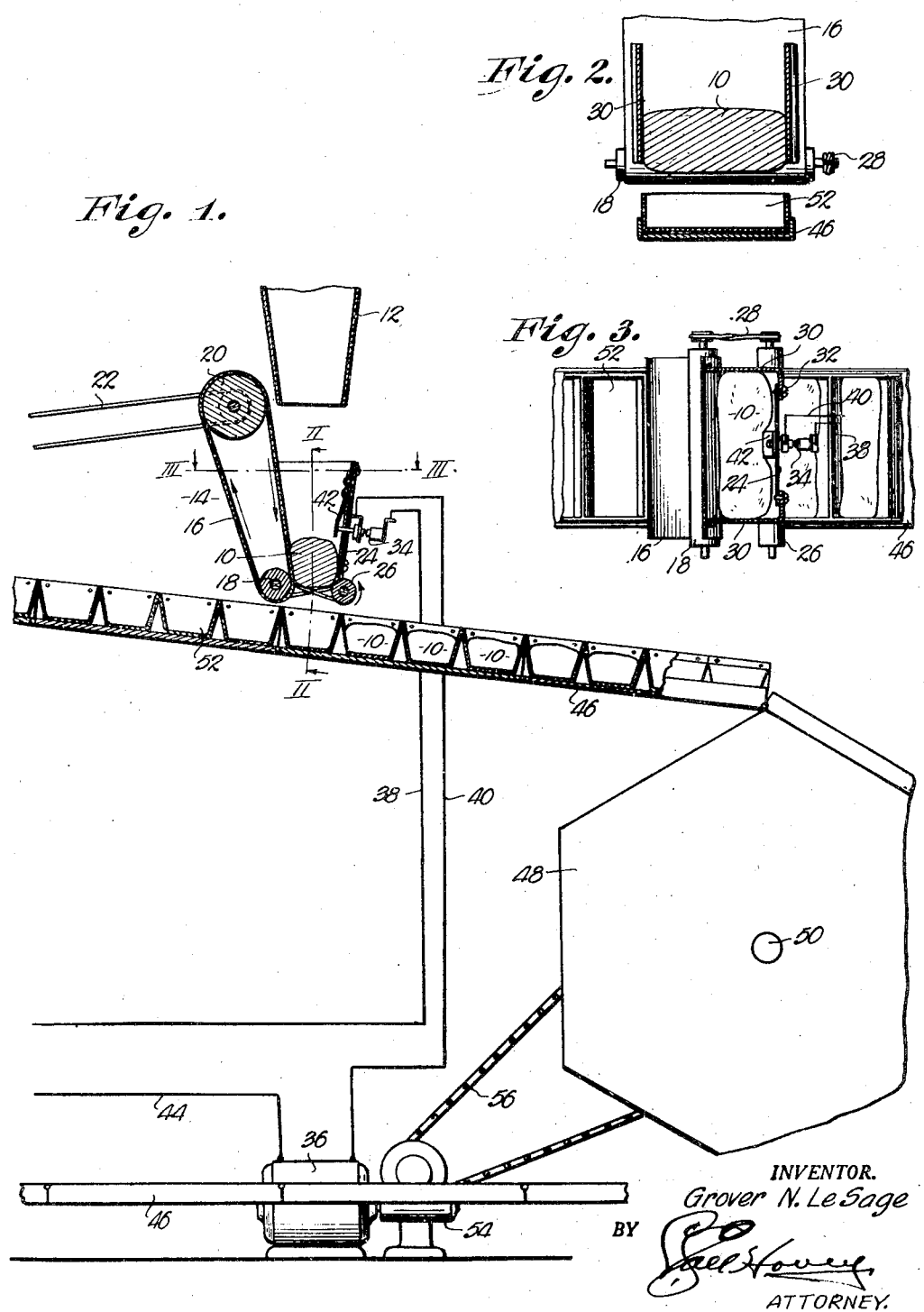
INVENTOR.
Grover N. Le Sage
BY
ATTORNEY.

INVENTOR.
Grover N. LeSage
BY
ATTORNEY.

Patented Mar. 30, 1948

2,438,811

UNITED STATES PATENT OFFICE 2,438,811

DOUGH PRESSING AND FEEDING APPARATUS

Grover N. Le Sage, Kansas City, Mo.

Application March 10, 1945, Serial No. 582,036

4 Claims. (Cl. 107—9)

1

The aims of the invention will appear during the course of the following specification, alluding to the accompanying drawing wherein:

Fig. 1 is a diagrammatical, schematic view illustrating bakery equipment having my dough pressing and feeding apparatus as a part thereof.

Fig. 2 is a fragmentary vertical sectional view taken on line II—II of Fig. 1.

Fig. 3 is a horizontal fragmentary sectional view taken on line III—III of Fig. 1.

Figure 4:
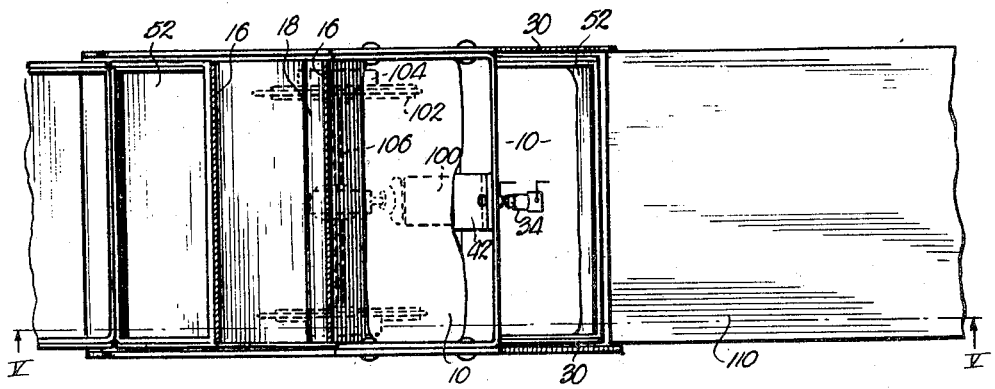
Fig. 4 is a top plan view of dough pressing and feeding apparatus embodying a modified form of my invention.

The presently employed, relatively expensive method of rolling and pressing a dough piece prior to its introduction to an empty baking pan, is inefficient and inaccurate to the extent that the several dough pieces are not acted upon with like intensity, and therefore, the texture and gas content of the successive dough pieces varies as a direct result of inherent peculiarity of both dough and machine, all of which cannot be controlled.

The handling of the dough pieces as is now the custom, as they are rolled and pressed and prior to the introduction into the baking pans, also is objectionable from the standpoint of time and labor lost, and therefore, the dough pressing and feeding apparatus about to be described in detail, is advantageous in any conventional bakery system where dough for bread is prepared.

In the drawing, the numeral 10 designates the dough piece of fixed weight that has been moved from the proofer through a de-gasser, such as forms the subject matter of my co-pending application filed even date herewith.

From the de-gasser the dough piece 10 travels downwardly along conduit 12 and into the pressure chute broadly designated by the numeral 14, and comprising in the main, an open top and bottom member through which the dough piece 10 travels by the action of gravity and the urgency of one stretch of an endless belt 16. This one stretch of the endless belt 16 forms one substantially vertical side of the pressure chute 14. The endless belt is mounted upon rollers 18 and 20, and the latter is belted as at 22 to any suitable source of power not here shown.

The opposite side of pressure chute 14 is fixed with respect to belt 16 and comprises a wall 24 having a roller 26 at its lowermost edge. This roller 26 is belted as at 28 to roller 18 and the belt is so arranged as to cause the roller 26 to rotate in the direction of the arrow shown in Fig. 1.

2

End walls 30 are adjustably mounted as at 32 to side wall 24 for movement toward and from each other—all to the result that the width of pressure chute 14 is increased or decreased to accommodate dough pieces of different lengths.

An electrical switch 34 which may be directly connected to motor 36 by wires 38 and 40, is actuated to the closed position by spring finger 42 mounted within pressure chute 14 and in the path of travel of dough piece 10. Obviously, this electrical circuit may include a conventional relay so long as the pressure upon finger 42 serves to close the circuit wherein motor 36 is disposed. Conductor 44 leads to a source of current supply as does conductor 38, and therefore, the circuit is completed to operate motor 36 when switch 34 is closed.

An endless belt 46 travelling around drum 48 rotatably mounted on shaft 50, supports a number of baking pans 52 in side-by-side relation. One stretch of belt 46 is downwardly inclined to a slight degree, as illustrated in Fig. 1, and when the greasing of the pans has been completed, they are placed upon belt 46 and slide together so that the space between each pan 52 is substantially the same. The speed reducer 54 in sprocket chain 56 joined to drum 48 in a manner to move belt 46 in step-by-step fashion, will function when finger 42 is depressed. The movement of belt 46 is sufficient to carry a filled pan 52 from below pressure chute 14 and to position an empty pan 52 thereunder.

In the normal operation of the dough pressing and feeding apparatus, dough piece 10 drops through conduit 12, while belt 16 is travelling in the direction of the arrows. The dough will be whirled about its longitudinal axis and the loaf will be formed in a fashion similar to, but more efficiently than the heretofore known mold board. A positive action upon dough piece 10 is exerted and as the same travels downwardly by gravity and mechanical force, it is compressed between the lower end of one stretch of endless belt 16 and roller 26. It then passes to an underlying pan 52. As its passage is effected, finger 42 will be depressed and an empty pan will be positioned, as above set down.

Figure 5:
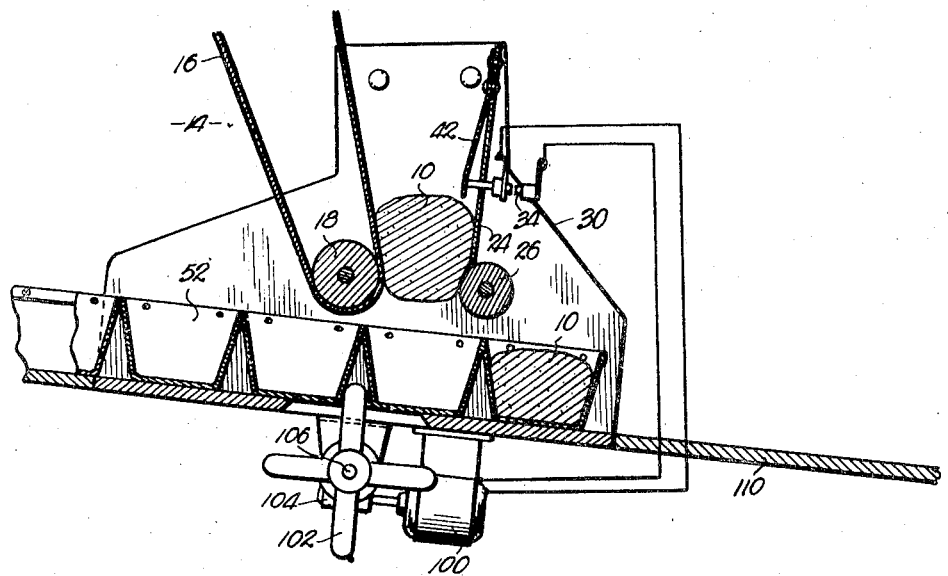
Fig. 5 is a vertical sectional view taken on line V—V of Fig. 4.

Means for advancing the conventional pans 52 may be in the form illustrated in Figs. 4 and 5. Motor 100 drives sprockets 102 when its circuit is closed through switch 34. Gearing 104 joins motor 100 to shaft 106 upon which the two sprockets 102 are mounted for engagement with pans 52, as shown in Fig. 5. As dough piece 10 closes switch 34, the pans are advanced step-bystep to insure the presence of an empty pan 52 beneath pressure chute 14. It is understood that pans 52 are shaped as shown and that space for the teeth of sprockets 102 is always present between adjoining pans.

Platform or chute 110 is the support for pans 52 and the pans are slid along the upper face of this chute as force is applied by sprockets 102.

As the dough piece 10 passes from conduit 12 into chute 14, the constant rotation of belt 16 forces the dough piece 10 against finger 42 and prevents lodging at that point by rotating the piece 10 and thereby causing the same to move downwardly. The distance between the lowermost end of belt 16 and the roller 26 is less than the thickness of the dough piece 10 to compress the same therebetween and to retard the progress of the dough piece 10 as the belt 46 moves one step. An empty pan 52 is thereby positioned below chute 14 after switch 34 has been actuated and before the dough piece 10 drops from chute 14.

Obviously, the forceful handling of the dough will allow a greater output than would be the case with a molder drum where the action of gravity is relied upon for the speed of travel. Fine texture and proper shape is the result of the use of the apparatus just described, and while but two embodiments of the invention has been illustrated and described, it is understood that pressing and feeding apparatus having physical characteristics different from those specified, might be made without departing from the spirit of the invention or scope of the appended claims.

Having thus described the invention, what is claimed as new and desired to be secured by Letters Patent is:

1. A feeding apparatus for dough handling equipment comprising a movable belt for the pans receiving the dough pieces; driving means for the belt; a chute above the belt through which the dough pieces pass to the pans on the belt; and a switch operable by the passage of dough pieces through the chute for actuating the driving means to advance the belt step-by-step as the dough pieces successively traverse the said chute, said chute progressively decreasing in cross sectional area as the lowermost end is approached to direct the dough piece against the switch as it passes through the chute.

2. A feeding apparatus for dough handling equipment comprising a movable belt for the pans receiving the dough pieces; driving means for the belt; a chute above the belt through which the dough pieces pass to the pans on the belt; and a switch in the chute engageable by the dough pieces as the latter pass through the chute for actuating the driving means to advance the belt step-by-step as the dough pieces successively traverse the said chute, said chute being formed to impede the progress of the dough piece through the chute after it engages the switch to permit advancement of the belt one step before the dough piece drops from the chute.

3. A feeding apparatus for dough handling equipment comprising a movable belt for the pans receiving the dough pieces; driving means for the belt; a chute above the belt through which the dough pieces pass to the pans on the belt; and a switch engageable by the dough pieces as the latter pass through the chute for actuating the driving means to advance the belt step-by-step as the dough pieces successively traverse the said chute, said chute being formed to impede the progress of the dough piece through the chute after it engages the switch to permit advancement of the belt one step before the dough piece drops from the chute, said chute having one side thereof constantly movable, the opposite side of the chute having a roller at the discharge end of the chute to cooperate with the movable side in compressing the dough piece for ejecting the said dough piece by force toward one of the pans below the chute after the progress of the dough piece has been impeded in the chute.

4. In dough handling equipment for feeding and depositing dough pieces in baking pans, a vertical chute progressively decreasing in cross sectional area as the lowermost end is approached, said chute having a switch therein operable by the dough piece to actuate pan positioning means below the chute; an endless belt having one of its stretches forming one side of the chute; a stationary wall forming the opposite side of the chute; and power means for rotating the endless belt to force the dough piece against the switch and through the chute.

GROVER N. LE SAGE.

REFERENCES CITED

The following references are of record in the file of this patent:

UNITED STATES PATENTS

| Number | Name | Date |
| --- | --- | --- |
| 870,212 | Aldred | Nov. 5, 1907 |
| 901,577 | Williams | Oct. 20, 1908 |
| 917,711 | Callow | Apr. 6, 1909 |
| 942,154 | Van Houten, Jr. | Dec. 7, 1909 |
| 1,312,640 | Mallinckrodt | Aug. 12, 1919 |
| 1,715,968 | Weber et al. | June 4, 1929 |
| 1,753,393 | Van Houten | Apr. 8, 1930 |
| 1,781,546 | Harber | Nov. 11, 1930 |
| 2,008,036 | Pointon et al. | July 16, 1935 |
| 2,214,521 | Bridge | Sept. 10, 1940 |